May 18, 1926.
D. M. BARDON
1,584,830
CABLE CONNECTING DEVICE
Filed August 10, 1925
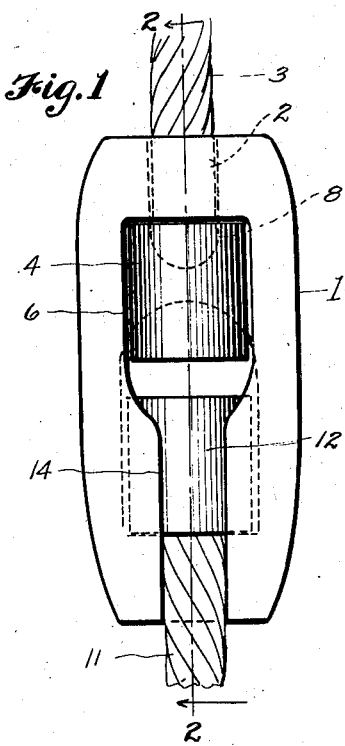
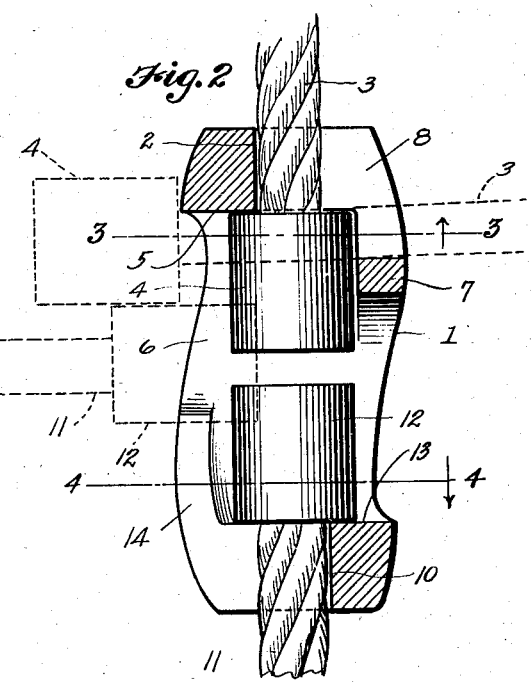
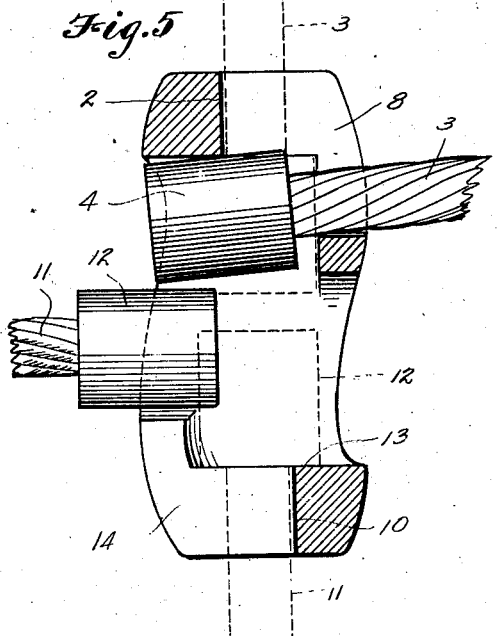
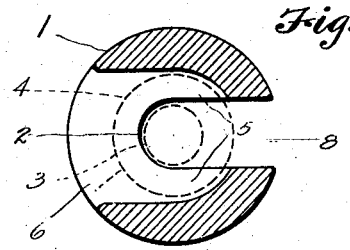
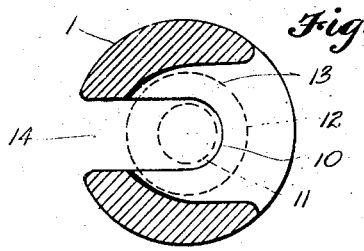
INVENTOR
DONIS M. BARDON
BY
Richard J. Cook
ATTORNEY Patented May 18, 1926.

1,584,830

UNITED STATES PATENT OFFICE.

DONIS M. BARDON, OF SEATTLE, WASHINGTON.

CABLE-CONNECTING DEVICE.

Application filed August 10, 1925. Serial No. 49,338.

This invention relates to improvements in cable connecting devices and more particularly to devices of that character adapted for use in logging operations for connecting the choker cables to the haul-in or butt lines; the devices being intended for use in the place of the commonly used bull hooks.

It is an object of the invention to provide a cable connecting device of the character above stated, in the form of a metal link that may, when it is so desired, be readily disconnected from the choker line, but which, due to its construction and the relation of parts which retains the ends of the cables therein, positively prevents a disconnection when in functional use.

Another object is to provided a cable connecting device that is externally smooth and free from any projecting parts that would render it more undesirable for use.

Other objects reside in the various details of construction and combination of parts as is hereinafter described.

In accomplishing the objects of the invention, I have provided the improved details of construction, the preferred forms of which are illustrated in the accompanying drawing, wherein—

Figure 1 is a side view of a cable connecting device embodied by the present invention.

Figure 2 is a sectional view of the same taken on the line 2—2 of Figure 1.

Figure 3 is a horizontal section on the line 3—3 in Figure 2.

Figure 4 is a horizontal section on line 4—4 in Figure 2.

Figure 5 is a vertical section of a hook of modified form.

Referring more in detail to the drawings—

The device, hereinafter referred to as a hook, in its preferred form of construction, consists of a block or link 1 of forged metal, substantially of cylindrical outline and slightly tapered at its ends so as to present a smooth external surface that will not catch on brush or timber through which it may be drawn. At the upper end of the link, (referring to it as shown in the drawings), is an axial opening 2 through which the end of the wire rope or cable 3, which in logging operations, is termed the haul-in line, or butt line, is extended and secured against displacement by means of a cylindrical ferrule 4 permanently fixed on its end. When there is any tension or pull on the cable the ferrule seats against a flat shoulder 5 within that end of the link.

That end of the hook which contains the end of cable 3 and ferrule 4 is provided with a side opening 6 which may be termed the entrance opening and which is of sufficient width and length that the ferrule may be displaced from the hook therethrough and moved to the position in which it is shown in dotted lines in Figure 2. At the side opposite the opening 6, the hook is partially closed by a cross web 7 provided with a slot 8 that leads into the opening 2 and which extends downwardly in the web below the shoulder 5 so as to permit the cable 3 to be swung laterally and downwardly to substantially a horizontal position so that the ferrule 4 may be displaced from the hook.

In the lower end of the hook is an axial opening 10 through which the end of the choker cable 11 is extended; this cable being provided with a ferrule 12 secured on its end and adapted to seat against a flat shoulder 13 within that end of the link. That side of the hook below the web 7 is open so that the end of the cable 11 and ferrule 12 may be removed therethrough and at the opposite side of the hook there is a restricted slot 14 extended in the axial direction of the hook which connects the lower end of entrance opening 6 with the base opening 10 so as to permit the cable 11 to be swung laterally and upwardly so that the ferrule may be removed from the hook through the opening 6.

To use the hook in logging operations, the link 1 is first attached to the haul-in line 3; this being done by inserting the end of the cable through the slot 8 and opening 6 and then fixing the ferrule 4 thereon.

The choker cable with ferrule 12 fixed on its end is first secured about the log and the ferrule, then seated in the end of the hook; this being done by first turning the link upwardly or by drawing the cable 3 downwardly, as indicated in Figure 2, so that the cable may be shifted laterally and the ferrule unseated and moved outside the link. The ferrule 12 is then inserted into the hook through the opening 6 below ferrule 4 and the cable 11 swung downwardly through slot 14 so as to seat the ferrule on shoulder 13.

It is to be observed by referring to Figures 1 and 2 that, when the device is in use, the ends of the ferrules 4 and 12 are closely adjacent each other and this prevents the unseating of the ferrule 12 and release of the choker line. It is a positive lock and cannot be released except by first slackening the cable 3 and shifting the ferrule 4 from the hook.

In Figure 5, I have shown an alternative construction that is substantially the same as that previously described except the body of the hook is lengthened and opening 6 extended so that it is not required that ferrule 4 be removed from the link in order to give room in the opening 6 for the unseating of ferrule 12, but, it is only necessary to turn ferrule 4 sideways, as shown.

The ferrules used to form the retaining enlargements at the ends of the cables 3 and 11 are, in both forms of hooks illustrated, of greater length than diameter and must necessarily be turned axially substantially at right angles to the axis of the hook in order that either one may be displaced therefrom. The construction is such that so long as the ferruled enlargements are in normal, end to end functional relation, coaxial of the hook they co-operate to prevent disconnection of the cable 11. The only way possible to release the cable 11 is to manually displace the ferruled enlargement of the cable 3 so that it will assume an angular position with respect to the axis of the hook and will, when thus displaced, provide passage for the removal of the ferruled enlargement 12 of the cable 11.

It is obvious also that by shortening the ferrule 4, or, by lengthening the lateral opening 6 so that the distance between the end of the ferrule and base of opening 6 is substantially equal to the diameter or width of the lower ferrule, it is not required then that the upper ferrule be displaced in order to permit the lower one to be applied or removed from the block, but it is only necessary that the lower ferrule be turned axially at a right angle to the axis of the block to be inserted into or removed from the latter. This alteration, however, would not effect the inter-locking relation of the ferrules so long as they were functionally in end to end relation.

Having thus described my invention, what I claim as new therein and desire to secure by Letters Patent, is:

1. In combination, a pair of cables having ends equipped with retaining enlargements and a connecting block having an open space therein for containing said enlargements functionally in interlocked relation against disconnection from the block and from which one of said enlargements may be manually displaced to provide passage for the removal from or application of the other enlargement to the block.

2. In combination, a pair of cables having ends equipped with retaining enlargements and a connecting block having cable receiving openings at its ends and having an interior space adapted to receive and functionally contain said enlargements in end to end interlocked relation against displacement, and having a lateral opening through which one of said enlargements may be displaced and disconnected from the block after the other enlargement has been manually displaced laterally from normal functional position within the said interior space.

3. In combination, a pair of cables having ends equipped with elongated retaining enlargements and a connecting block for said cable, having a space therein for containing said enlargements coaxially in interlocked relation against removal and having an axial opening at one end through which one of the cables is threaded and which extends sufficiently lengthwise of the link to permit the cable and its enlargement to be turned at an angle with the block and having provision at its other end for disconnection of the other cable enlargement when the first is thus turned.

4. In combination, a pair of cables having elongated enlargements at their ends and a connecting block for said ends having an interior space for containing said ferruled ends in end to end relation and having an axial opening at one end through which one cable is threaded and a slot communicating with said axial opening and extended longitudinally of the block to permit the cable and its enlargement to be turned angularly within the block and having an axial opening at its other end and a slot opening therefrom laterally of the link for seating the other enlargement or for removing it from the block.

5. In combination, a pair of cables having ends equipped with elongated enlargements and a connecting block for said cables having an interior, longitudinal space for containing said enlargements in end to end interlocked relation; said space having an entrance opening at one end to one side of the block; said block having an axial opening at one end through which the first cable is threaded and a slot communicating with said axial opening and extended longitudinally of the block a distance sufficient to permit the cable to be turned at an angle to the block and its enlargement to be angularly displaced within the block end having an axial opening at its other end connected with said entrance opening by means of a restricted slot through which the second cable may be moved when the end enlargement of the first cable is angularly displaced, to disconnect or connect it with the block.

6. In combination, a pair of cables having ends equipped with retaining enlargements and a connecting block therefor having an open space for containing said enlargements functionally in end to end relation; one of said enlargements being of greater length than width and normally prevented from displacement from the block by end contact with the other enlargement and adapted to be removed from or applied to the block when turned axially at a right angle to its functional position within the block.

Signed at Seattle, King County, Washington, this 23rd day of July, 1925.

DONIS M. BARDON.